UNITED STATES PATENT OFFICE.

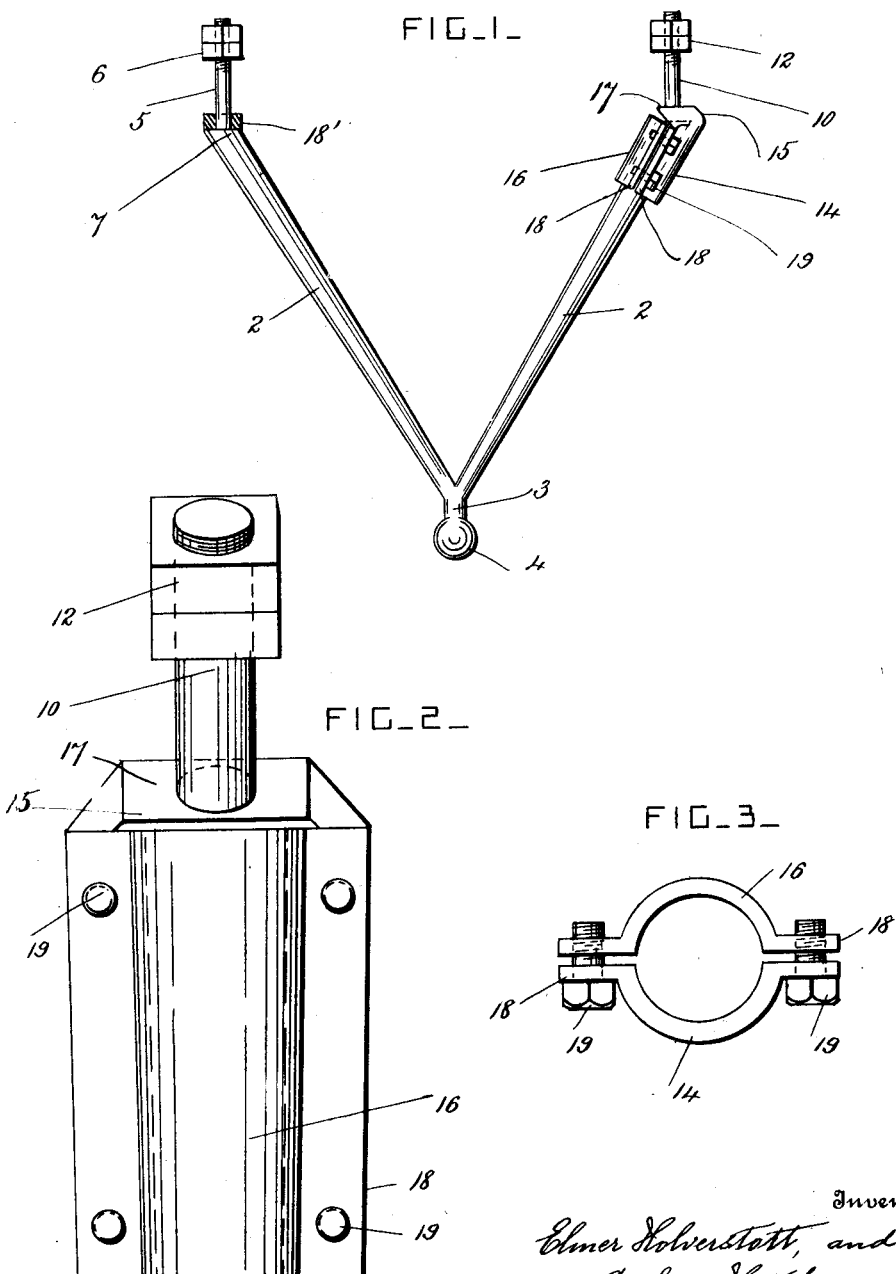

ELMER HOLVERSTOTT AND ARCHIE HATCHER, OF McKINLEY, OREGON.

RADIUS-ROD.

1,186,905.  Specification of Letters Patent.  Patented June 13, 1916.

Application filed December 8, 1915. Serial No. 65,735.

*To all whom it may concern:*

Be it known that we, ELMER HOLVERSTOTT and ARCHIE HATCHER, citizens of the United States, residing at McKinley, in the county of Coos and State of Oregon, have invented certain new and useful Improvements in Radius-Rods; and we do hereby declare the following to be a full, clear, and exact description of the invention, such as will enable others skilled in the art to which it appertains to make and use the same.

This invention relates to radius rods used on motor cars; and it consists in providing an adjustable end portion or portions for attachment to the bars of the radius rod so that broken radius rods can be made serviceable, as hereinafter fully described and claimed.

In the drawings, Figure 1 is a plan view of a radius rod for a motor car provided with an adjustable end portion according to this invention. Fig. 2 is a side view of the end portion drawn to a larger scale and turned around one quarter from the position shown in Fig. 1. Fig. 3 is an end view of the socket of the adjustable end portion.

The radius rod is formed of two bars 2 arranged at an acute angle to each other. At one end these two bars are welded together and provided with a stem 3 having a ball 4 which forms a portion of a ball and socket joint of approved construction. At their disconnected ends the two bars ordinarily have screw-threaded stems 5 which are arranged at an angle to the bars 2 and parallel to the stem 3 and to each other. Similar nuts 6 are provided on the stems 5 for securing the radius rod in place. Each bar 2 is tapered and is thickest at the end next to its stem 5 and an abutment shoulder 7 is formed around its stem 5.

The jolts and jars to which the motor car is subjected frequently cause the stems 5 to break at the shoulders 7, and in order to make the radius rod serviceable adjustable end portions or stems 10 are provided. Each stem 10 is screwthreaded and is provided with a fastening nut 12.

The stem 10 is provided with a cylindrical tapering socket formed of two halves 14 and 16 having flanges 18 and bolts 19 for clamping the socket on the radius rod. The socket portion 14 has a laterally projecting flap 15 at one end which overlaps the broken end of the radius rod and the axis of the socket, and the stem 10 projects from this flap, and is arranged at an angle to and upon the axis of the socket so that it may take the same position as the original stem and engage with the same part. The flap 15 forms a shoulder 17 at the base of the stem 10 which serves as an abutment similar to the original shoulder 7.

The half socket 14 is arranged at an angle with its stem 10 to correspond with the angle of the bar to which it is to be attached. The other half of the socket is formed of a cover plate 16, and the two halves of the socket have similar flanges 18 and bolts 19 for clamping the socket on the larger end portion of one of the bars 2. The socket is tapered to correspond with the taper of the bar, and it is adjusted longitudinally on the bar before being clamped to it.

A single adjustable end portion can be used for either bar which happens to break. If desired, both bars 2 can be provided with these adjustable end portions in the first place, and when a stem 10 is broken another adjustable end portion can be substituted for the one with the broken stem.

Washers 18' may be used on the unbroken stem to equalize the length of the stems.

What we claim is:

An end portion for repairing a broken radius rod, comprising a socket portion formed in halves and adapted to be clamped around the broken end of the rod, one of the said halves having a laterally projecting flap which overlaps the axis of the said socket and which is provided with a screw-threaded stem arranged upon a prolongation of the axis of the socket and at an angle to the said axis.

In testimony whereof we affix our signatures.

ELMER HOLVERSTOTT.
ARCHIE HATCHER.